US006539415B1

United States Patent
Mercs

(10) Patent No.: US 6,539,415 B1
(45) Date of Patent: *Mar. 25, 2003

(54) METHOD AND APPARATUS FOR THE ALLOCATION OF AUDIO/VIDEO TASKS IN A NETWORK SYSTEM

(75) Inventor: James Mercs, Huntington Beach, CA (US)

(73) Assignees: Sony Corporation, Tokyo (JP); Sony Pictures Entertainment, Inc., Culver City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,178

(22) Filed: Sep. 24, 1997

(51) Int. Cl.[7] .................................................. G06F 9/00
(52) U.S. Cl. ....................................................... 709/104
(58) Field of Search .......................... 364/200; 395/674, 395/650; 709/104

(56) References Cited

U.S. PATENT DOCUMENTS

| | | | | |
|---|---|---|---|---|
| 4,855,899 A | * | 8/1989 | Presant ........................ | 364/200 |
| 5,442,789 A | * | 8/1995 | Baker et al. ................. | 395/650 |
| 5,724,587 A | * | 3/1998 | Carmon et al. .............. | 395/674 |
| 5,748,468 A | * | 5/1998 | Notenboom et al. ........ | 364/132 |
| 6,172,705 B1 | * | 1/2001 | DiFrancesco et al. ......... | 348/97 |

* cited by examiner

Primary Examiner—Zarni Maung
Assistant Examiner—George L. Opie
(74) Attorney, Agent, or Firm—Blakely, Sokoloff, Taylor & Zafman LLP

(57) ABSTRACT

The system and method of the present invention provides a structure and method for implementing a configurable and scalable A/V system that enables a user to perform processes across one or more A/V processing devices coupled together via a network. In one embodiment, a plurality of configurable A/V systems are coupled via a network. At least two of the A/V systems include digital signal processors (DSPs) that are programmable. The A/V systems also include other resources, such as data storage, synchronizers, analog to digital converters, digital to analog converters, etc., to support the variety of audio/video processing to be performed. In one embodiment, the user inputs at least one task to performed. The task is broken down into basic processing components or primitives. These primitives are defined in a processor descriptor block maintained by the system. The processor descriptor block indicates the processing requirements and distributability of the process across the network. For example, in one embodiment, the processor descriptor block identifies the number of cycles necessary to perform the process, any resource dependencies, and whether the process can be performed across multiple networked systems. A control process therefore references the process descriptor block and determines the bandwidth and resource requirements. The bandwidth and resource requirements are then compared to the device and system configurations and allocations to determine if the primitive can be performed using available bandwidth and resources in the device and devices coupled via the network.

22 Claims, 5 Drawing Sheets

Processor Descriptor Block

| Primitive Operation | Cycle Count | Dependencies | Expandability | Quality |
|---|---|---|---|---|
| Record 16 bit | 30 Cycles | Storage Device SCSI controller A/D Converter | Yes | 16 bit Audio |
| Record 24 bit | 60 Cycles | Storage Device SCSI controller A/D Converter | Yes | 24 bit Audio |
| Low Pass Filter | 30 Cycles | -- | Yes - System No - Network | |
| Increase Gain | 8 Cycles | Synchronizer Board | Yes | |
| Mix | 20 Cycles | -- | Yes | |
| Playback | 50 Cycles | D/A Converter Output Jack Real Time Meters Storage Device; SCSI | No | |
| Store | 40 Cycles | Storage Device SCSI controller | Yes | |

SYSTEM CONFIGURATION

- A/V Processor 1
    - DSP Card
        - 5 DSPs Capacity Cycles
    - DSP Card
        - 5 DSPs Capacity Cycles
    - DSP Card
        - 5 DSPs Capacity Cycles
    - 10 A/D / D/a Converter

- 20 Gigabyte Hard Drive
    - VTR
    - Headphone Jack
    - Microphone Jack
        •
        •
        •

- A/V Processor N
    - DSP Card
        - 10 DSPs Capacity Cycles
    - DSP Card
        - 10 DSPs Capacity Cycles
        •
        •
        •

Allocation Linked List

| User | User Location | Primitive to be performed | Where the Primitive is to be executed |
|---|---|---|---|
| Jim | Subsystem 1 | Store | Subsystem 1 |
| Jim | Subsystem 1 | Increase Gain | Subsystem 1 |
| Jim | Subsystem 2 | Low Pass Filter | Subsystem 2 |
| Jim | Subsystem 1 | Playback | Subsystem 1 |
| Jim | Subsystem 1 | Mix | Subsystem 2 |
| Jim | Subsystem 1 | Store | Subsystem 3; Subsystem 4 |

*FIG. 6*

METHOD AND APPARATUS FOR THE ALLOCATION OF AUDIO/VIDEO TASKS IN A NETWORK SYSTEM

BACKGROUND OF THE INVENTION

1. Field of the Invention

The present invention relates to audio and video processing systems. More particularly, the present invention relates to a distributed audio and video system and method of utilizing the same.

2. Art Background

Audio and video can now be processed digitally. Analog audio or video signals are sampled and converted to digital signals. The digital signals can then be digitally processed, e.g., filtered, equalized, mixed, recorded, etc. Audio/video (A/V) processing devices are typically configured to perform a particular task. Many different processes performed can be categorized as digital signal processing. Thus the A/V processing devices typically include one or more digital signal processors (DSPs) which are designed to perform a particular process. Software configurable DSPs enable a DSP to be configured to perform a particular process at time of initialization of the DSP. However, even with configurability of DSPs, the user of the A/V device is limited to the DSP bandwidth and available resources of the device.

Typical A/V systems, which may include multiple user workstation devices, such as those found in television or movie studios, only execute tasks on individual devices. Thus, if the resources or bandwidth on a single device is not available the task is not performed or is deferred until the bandwidth and resources are available.

SUMMARY OF THE INVENTION

The system and method of the present invention provides a structure and method for implementing a configurable and scalable A/V system that enables a user to perform processes across one or more A/V processing devices coupled together via a network. In one embodiment, a plurality of configurable A/V systems are coupled via a network. At least two of the A/V systems include digital signal processors (DSPs) that are programmable. The A/V systems also include other resources, such as data storage, synchronizers, analog to digital converters, digital to analog converters, etc., to support the variety of audio/video processing to be performed.

In one embodiment, the user inputs at least one task to performed. The task is broken down into basic processing components or primitives. These primitives are defined in a processor descriptor block maintained by the system. The processor descriptor block indicates the processing requirements and distributability of the process across the network. For example, in one embodiment, the processor descriptor block identifies the number of cycles necessary to perform the process, any resource dependencies, and whether the process can be performed across multiple networked systems. A control process therefore references the process descriptor block and determines the bandwidth and resource requirements. The bandwidth and resource requirements are then compared to the device and system configurations and allocations to determine if the primitive can be performed using available bandwidth and resources in the device and devices coupled via the network. If it can be performed, the DSPs and resources are allocated and noted in an allocation list. The DSPs allocated are then configured to perform the particular processes to be performed such that the primitive processing can be executed using the allocated DSPs and resources.

BRIEF DESCRIPTION OF THE DRAWINGS

The objects, features and advantages of the present invention will be apparent from the following detailed description in which:

FIG. 4 is an exemplary processor descriptor block in accordance with the teachings of the present invention.

FIG. 5 is an exemplary configuration file utilized in accordance with the teachings of the present invention.

FIG. 6 is an exemplary allocation list in accordance with the teachings of the present invention.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
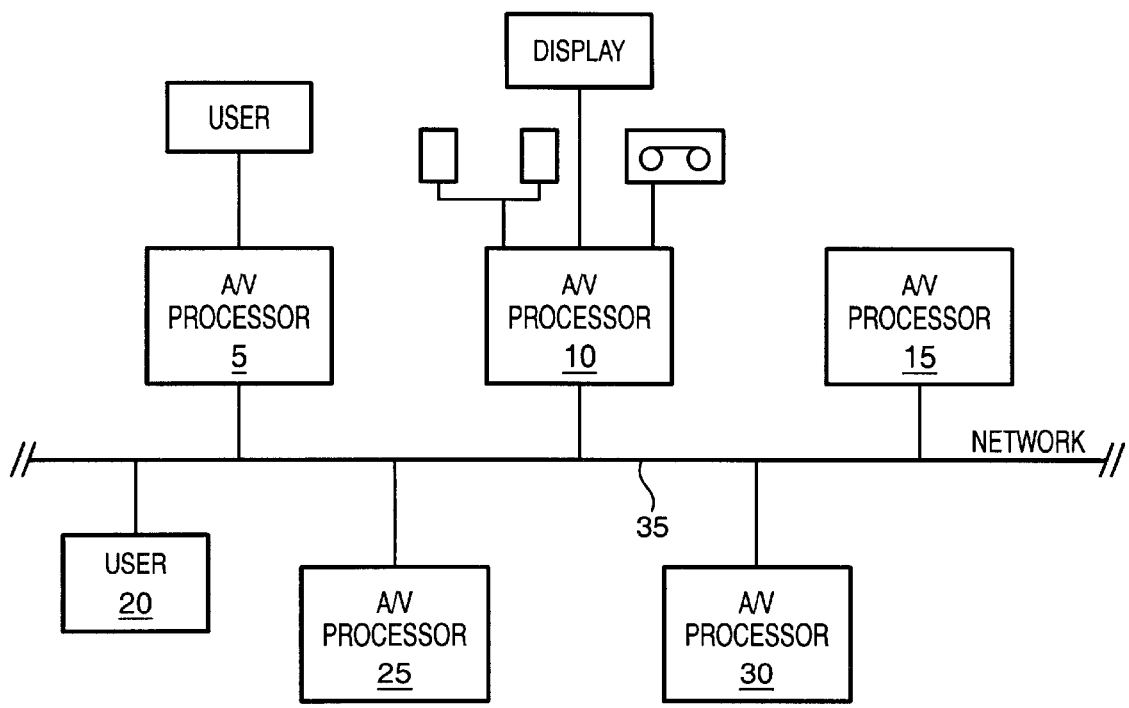
FIG. 1 is a general system block diagram that operates in accordance with the teachings of the present invention.

FIG. 1 is a simplified block diagram of one exemplary system that operates in accordance with the teachings of the present invention. The system includes a plurality of devices 5, 10, 15, 20, 25, 30 connected via a network 35. The devices include audio/video (A/V) processor devices 5, 10, 15, 25, 30, including configurable A/V processors as will be described in more detail below. Other devices, such as a general purpose computer 20, running an interface for a user to input tasks to be executed, can also be connected to the system. In addition, it is contemplated, although not shown, that still other devices, providing specific resources or specific DSP processes may also be coupled to the network 35 and provide the resources and processing required to support the processes to be performed.

The A/V processor devices may be configured a variety of ways to include differing numbers of DSPs, sizes of memory and storage, different resources and connections to different resources. For example, as shown in FIG. 1, user computer 40 is directly connected to A/V Processor Device 5. A display, 45, storage devices 50, 55 and tape recorder 60 are connected to A/V processor device 10. A/V processor device 25 may include 10 DSP cards connected to an internal bus of the device 25, each card containing 10 DSP components and A/V processor may include 5 DSP cards, 10 A/D and D/A converters and a synchronizer card connected to its internal bus. Other embodiments and variations are also contemplated.

In the present embodiment, the DSPs used have the same processing power, i.e., the same number clock cycles are required to perform the same instructions. However, it is contemplated that the teachings of the present invention is expandable to systems that include DSP having different processors.

Figure 2:
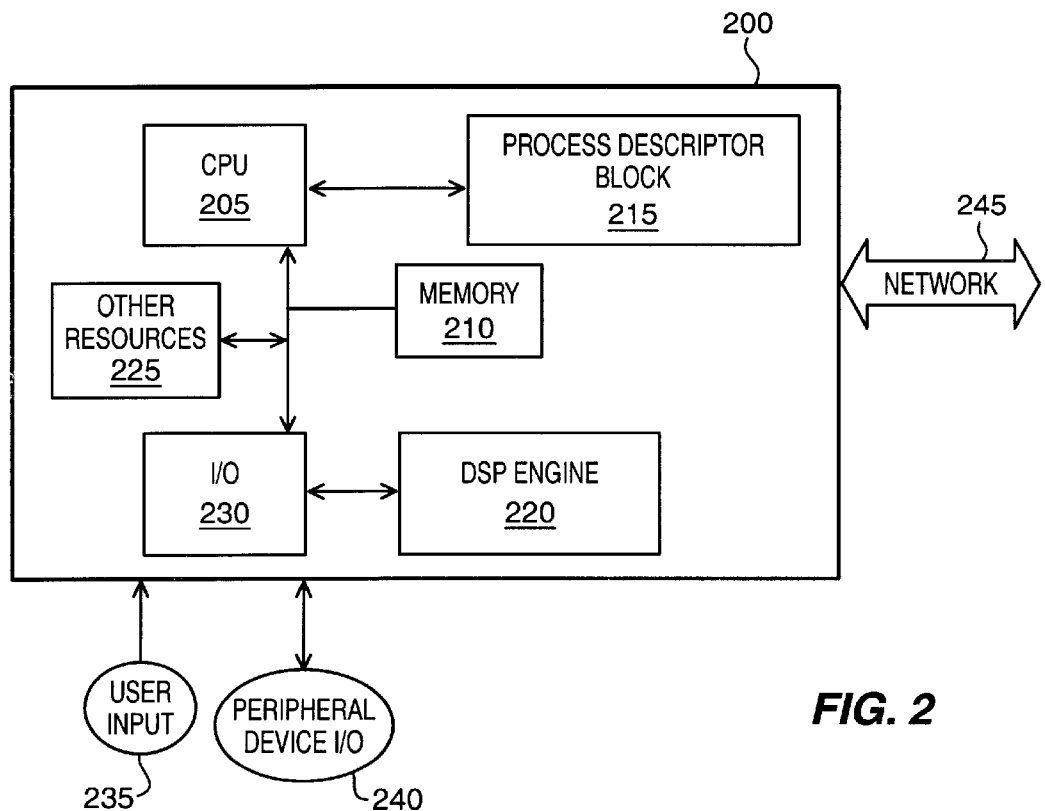
FIG. 2 is block diagram of one audio/visual processor that operates in accordance with the teachings of the present invention.

One embodiment of an A/V processor device that operates in accordance with the teachings of the present invention is illustrated in simplified block diagram form in FIG. 2. A/V processor device 200 includes a central processing unit (CPU) 205 connected to memory 210, process descriptor block (PDB) 215, DSP engine 220, resources 225 and input/output interface 230 which couples to devices 235 and 240. User input device 235 may be a personal computer operating a user interface that enables the user to enter tasks to be performed. Other embodiments are also contemplated. For example, alternately, components, such as switches, dials and the like located on the housing of the A/V processor device 200, enable the user to enter the tasks to be performed.

CPU 205 functions as a controller to control the allocation and execution of user input tasks as will be described below.

Peripheral device I/O 240 is representative of the variety of possible external devices that may be coupled to the A/V processor device 200. For example, peripheral device I/O 240 may be an audio tape recorder, video tape recorder (VTR), multiple channel drivers to drive a headphone or speakers, multiple channel inputs to receive analog signals, such as those signals received from microphones or tape players, as well as any other types of devices used in the A/V processing environment.

The memory 210 is representative of one or more memory devices. For example, memory 210 is used to store code executed by CPU to perform the processes described below. As will be explained below, It is contemplated that memory 210 may also be configured to store code to be downloaded to the DSPs to perform processes to execute tasks input by the user. Furthermore, memory 210 may be used to store data processed by the A/V processor device 200.

DSP engine 220 represents the DSPs used to perform the processing of audio and video data. Preferably the DSPs are configured into interconnected banks located on circuit boards that includes circuitry to couple the card to the bus. Multiple cards containing banks of DSPs can be connected to the internal bus of A/V processor device 200 to provide significant DSP capacity in the device 200. Other embodiments and DSP structures are also contemplated.

As noted above, a number of other resources 225 may be installed in A/V processor device 200. For example, specialized peripherals, such as synchronizers (e.g., video reference generator, linear time code generator) remote control devices or other computer devices, and the like may be connected to the internal bus of the device 200. Thus, the resources 225, DSP engine 220 and peripherals 240 typically provide the support to execute the tasks input by the user.

The processor descriptor block 215 identifies the primitive operations that can be performed and the bandwidth and resources required. The PDB is used to determine the DSPs and other resources required to execute various user input tasks.

The capacity required can vary significantly according to the tasks to be performed. Thus, it is contemplated that the system is scalable to connect multiple A/V processor devices 200 through the network to support varying levels of capacity. Furthermore, internally, the number of DSPs supported is scalable; in addition the number of devices is scalable.

Figure 3:
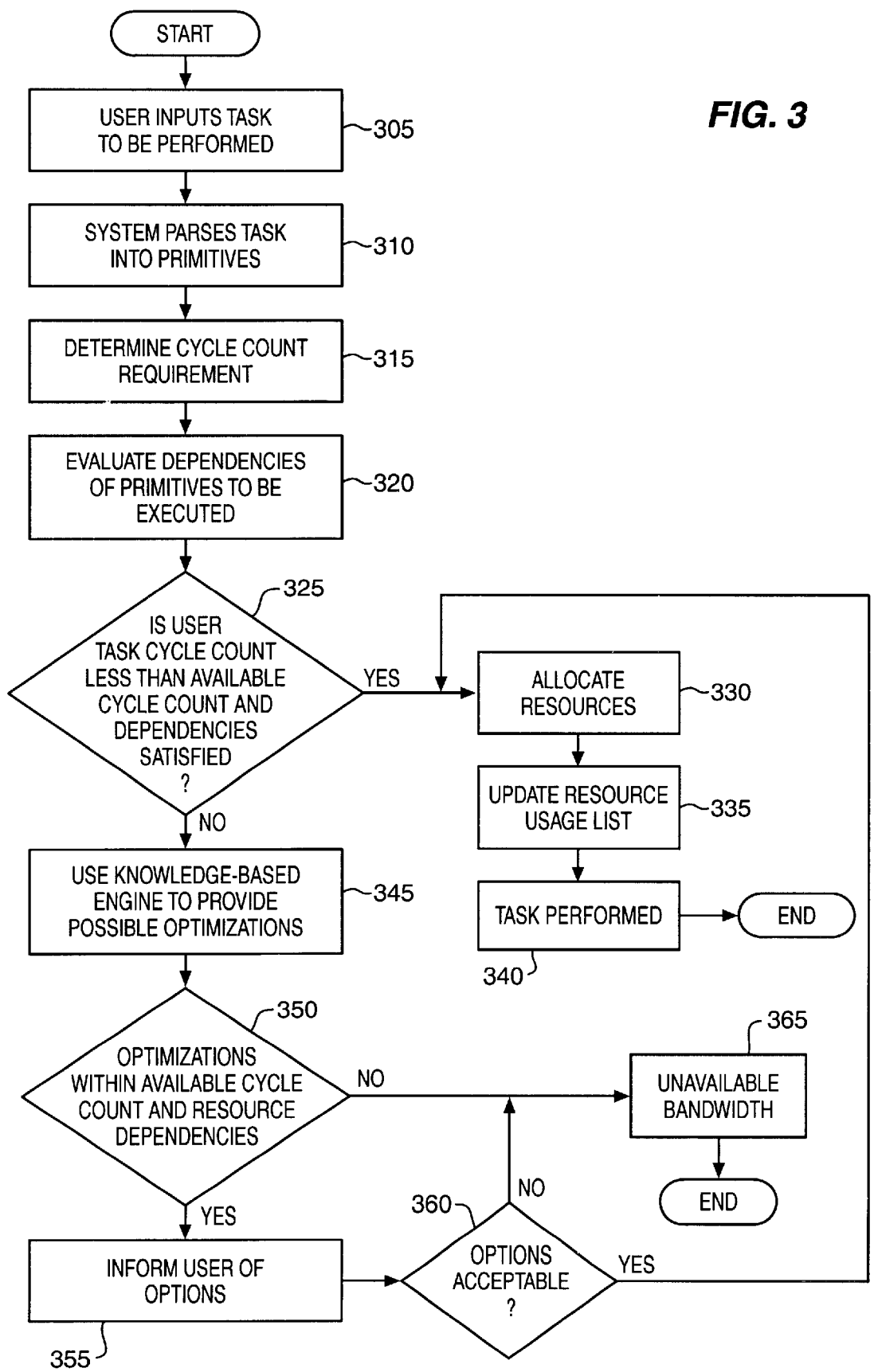
FIG. 3 is a simplified flow chart illustrating one embodiment of the process of the present invention.

The process performed to allocate resources is now described with reference to FIG. 3. At step 305, the user inputs at least one task to be performed. The tasks include a variety of known editing, enhancement and mixing processes performed on audio or video. At step 310, the input tasks are parsed into primitives. It has been determined that most tasks correspond to or can be broken down into one or more primitives. For example, a request to "mix and play-back" is formed of two primitives "mix" and "playback". The definition of the functions that define primitives can vary; however, preferably the primitives are basic functions typically performed in an audio/video system. The primitives can be identified a variety of ways; however, it is preferred that the primitives are identified empirically by examination of typical tasks performed and the underlying operations performed. By using primitives, the resource allocation process becomes more flexible as constraints can be limited on a primitive level instead imposing constraints on a task level. The step 310 of parsing the primitives can be performed a variety of ways. One way to perform the step is via a table look-up wherein the table lists all possible tasks and the corresponding primitives.

At step 315, the cycle count for each of the primitives is determined and at step 320 the dependencies of the primitives is determined. Preferably, this is possible through the lookup of a process descriptor block (PDB) maintained in the system. One embodiment of the PDB is shown in FIG. 4. The PDB identifies cycle requirements, device dependencies, expandability and quality information for each primitive. The cycle requirements field identifies the number of clock cycles needed to perform one occurrence of the primitive. This is used to determine whether there is available cycle count a DSP to perform the primitive. If the primitive is to be performed on multiple data streams, e.g., multiple channels, the cycle count requirements and resource dependencies are increased correspondingly. The device dependencies field identify any hardware or peripherals needed to execute a primitive. For example, the record primitive requires an input device, a number of Analog to Digital (A/D) converters and memory or storage to store the digital representation of the audio or video. Other primitives may require specialized logic or plug-in boards that perform a particular part of the primitive process.

The expandability field indicates whether if the primitive can be performed across several boards or across networks. Typically, a process, e.g., record involves several channels or data streams. Thus the primitive is executed several times, one for each channel. The overall process will be executed more quickly if the process is performed on the several channels concurrently. However, in some situations, the timing margins are such that it cannot be expanded across the network because of the number of cycles that is required to move data across the network; in other situations the timing margins are so tight that the process must be performed locally and cannot be expanded across DSP boards connected via system bus.

The problems that can arise are realized from the example of playback of audio from disk for output. If the time requirement to retrieve a portion (e.g., block) of audio exceeds the amount of time it takes to output the audio of a prior block, gaps of silence will occur. Thus, playback across a network may not be possible if the network is not fast enough. This problem also can arise when fast-forwarding or reversing to a different audio portion.

In the present embodiment, every instantiation of a primitive to be executed is provided a time stamp of when execution of the primitive is to be started and a time stamp that the output of the primitive must be generated by. The time stamp is determined by the allocation process. Thus, if the amount of time required to transmit and receive a message across the network, containing the output time stamp and execute the primitive causes the time identified by the time stamp to pass, the execution of the primitive across the network is not possible and execution must be performed locally.

At step 325, if the cycle count is less than the available cycle count and the resources specified in the dependencies field in the PDB are available, the DSPs and resources are assigned and configured, step 330, the resource usage list is updated to include the new allocations, and the task can be performed step 340.

It is contemplated that the assignment and configuration process can occur a variety of ways. In one embodiment, messages are sent to the allocated devices by the allocation or companion control process. The message will include a timestamp indicating when the primitive or part of the primitive is to begin execution and a timestamp indicating when the output is to be generated by. All devices utilize the same time clock in order to synchronize the different process performed.

The available cycle count and available resources can be determined by the identification of elements in the system configuration and an identification of what has already been allocated. In one embodiment, a system configuration file is maintained. The system configuration file includes a listing of all the resources in the systems. If a system having DSPs is implemented, it is preferred that the capacities (e.g., cycle counts) of the DSPs or types of DSPs are identified; this information may also be separately maintained. In addition, it is preferred that the configuration file further indicate where in the networked system the particular DSP or other resource is located. An example of one possible embodiment of a configuration file is shown in FIG. 5.

The allocated DSPs and other resources are also identified in order to determine what resources are available for allocation to perform a particular primitive. In one embodiment a resource usage list is maintained which identifies allocated DSPs and resources. An example is shown in FIG. 6.

Referring back to FIG. 3, if at step 325 it is determined that insufficient cycle count or resources are unavailable, the system attempts to perform optimizations to lower the cycle count and/or resource requirements. A variety of approaches to optimization are contemplated. In one embodiment, a knowledge-based engine or program is implemented to review the input tasks to determine how the input can be changed to optimize. In certain situations, optimization can be achieved by reordering the processes or primitives performed; for example, it may require fewer cycles if one process is performed before another. Alternately, by reordering processes, certain processes having limited expandability may be allocated cycles and resources before other processes not so limited. Other optimizations can be achieved by limiting the precision or resolution of a process performed. It is also contemplated that in certain situations optimization is achieved by eliminating execution of certain primitives. The knowledge-based engine is preferably empirically developed based upon working knowledge of video and audio engineers and technicians or by testing optimizations of certain recurrences of sequences of primitives. The actual implementation of the knowledge based engine can be achieved a variety of ways using a variety of data structures and corresponding accessing programs known to one skilled in the art and will not be discussed further herein.

Preferably the optimizations are not automatically performed. Instead the user is notified of the proposed optimizations and given the option to perform incorporate the optimizations, step 355. This is particularly beneficial when the optimization decreases the resolution or precision of certain processes. The user then has the choice whether to accept the options for optimization presented to him. If acceptable to the user, step 360, the DSPs and other resources are allocated and the DSPs programmed, step 330, the resource usage list is updated, step 335 and the task can be performed, step 340.

If optimizations can not be performed or if the user finds the optimizations unacceptable, the user is notified of unavailable bandwidth, step 365. At this point the user can wait for available resources or proceed with the input of other tasks for which there may be available resources.

Although not required to perform the allocation process, the allocation of DSPs and resources are performed by a control script or process generated which identifies the primitives to be performed, the DSPs or other resources allocated to execute each primitive and the time stamp at which the resultant output of each primitive is to be provided. To execute the task, the script or process is executed. The script or process can reside on a local or remote device. The data exchange can be handled a variety of ways. For example, the message identifying when to generate the output may also indicate an address of a device to output to. Alternately, the default would be to return the output to the control process and the control process would forward the output to the next device for processing.

As noted earlier, the DSPs are programmable to perform a variety of functions. It should be realized that the DSPs therefore may be reprogrammed for each allocation, depending upon the function to be performed. Depending upon implementation, the DSPs may be programmed at time of allocation or at some other time prior to execution of the task. The programming operation may take place locally wherein the device containing the DSP to be programmed is sent a message by the allocation or control process to program the DSP to execute a specified process. Alternately, the allocation or control process sends the data to program the DSP. A variety of implementations are contemplated.

The above process is preferably performed by a general purpose processor executing software stored in the system. Other implementations, such as programmed logic, hardware or some combination of hardware, logic or software are also contemplated. Furthermore, in one embodiment, each system accepting user input tasks includes the hardware and software to perform the allocation process. In such an implementation, either a central copy of the configuration file and resource allocation list would be maintained or alternately, a process maintaining consistency among copies of the configuration file and resource allocation list would be operable. The allocation process can also be performed in a centralized manner wherein one device coupled to the network determines the allocation of resources. Thus, in such an embodiment, the user input tasks would be forwarded to central computer performing the allocation.

Thus the present invention provides an innovative mechanism to maximize resource usage in a networked audio/video system. The benefits will be further realized through the simple example illustrated by FIGS. 4-6.

In the present example, the user requests the following tasks to be performed: Record 8 channels of audio, low pass filter at 200 Hz on 4 channels, increase the gain +3 db on the other 4 channels and mix down all 8 channels to 2 channels and playback the two channels through a headphone jack. The input tasks are therefore broken down into the following primitives:

| TASK | PRIMITIVE |
| --- | --- |
| Record 8 channels of audio | Record |
| Increase gain & 3dB on 4 channels | gain adjust |
| LPF at 200 Hz the other 4 channels | LPF |
| Mix down all 8 channels to two channels, store the two channels and playback the two channels and play through headphone jack | MIX Store Playback |

The system then determines the capacity needed to perform the primitives. This can be determined by reference to the PDB, a subset of which is illustrated in FIG. 4. FIG. 4 illustrates the cycle requirements and resource dependency required for each of the primitives. Using the information extracted from the PDB, the system determines the bandwidth and resources needed and compares it to the available bandwidth and resources determine by analyzing the configuration file, an example of which is illustrated in FIG. 5, and the resource allocation list (FIG. 6). If sufficient bandwidth and resources are available, the resource allocation list is updated to include the allocated resources for the input task.

The invention has been described in conjunction with the preferred embodiment. It is evident that numerous alternatives, modifications, variations and uses will be apparent to those skilled in the art in light of the foregoing description.

What is claimed is:

1. A scalable audio/video processor system comprising:
    support resources, including:
        a plurality of configurable digital signal processors (DSPs), at least some of the DSPs coupled together through a network connection; and
        at least one device coupled to the plurality of configurable DSPs;
    a process descriptor block to identify usage requirements of tasks, said usage requirements comprising cycle count, support resource dependencies, and expandability requirements; and
    a control processor coupled to the support resources and to the process descriptor block, said control processor configured to:
        determine the usage requirements of a given input task to be performed;
        determine the usage requirements that can be supported by the support resources, including the configurable DSPs;
        allocate at least determined portions of those requirements of the given input task to selected support resources based upon the determined usage requirements; and
        automatically control the configuration of each DSP of the allocated support resources to perform the given input task.

2. The system as set forth in claim 1, wherein each task comprises primitive operations, and said process descriptor block identifying usage requirements of primitive operations, said control processor further configured to break down each input task into primitive operations and determine usage requirements by combining usage requirements of the primitive operations that compose each input task.

3. The system as set forth in claim 1, wherein the system comprises at least one subsystem, each subsystem comprising at least one support resource of the support resources coupled via a network.

4. The system as set forth in claim 3, wherein the at least one support resource comprises a subgroup of the plurality of configurable DSPs interconnected via a bus.

5. The system as set forth in claim 2, further comprising a table comprising a plurality of tasks and corresponding primitives required to perform the tasks, wherein the primitives to perform the given input task are determined by performing a lookup of the table.

6. The system as set forth in claim 1, further comprising a memory configured to store configuration data, said control processor configured to configure the configurable DSPs by transferring configuration data to each DSP of the allocated support resources to perform the given input task.

7. A method for performing audio/video processing comprising:
    inputting at least one input task to be performed;
    determining usage requirements of the at least one input task by referencing a process descriptor block configured to identify usage requirements of tasks, said usage requirements comprising those requirements to be supported by support resources, including a plurality of digital signal processors (DSPs) and at least one device, at least some of the DSPs and at least one device coupled together via a network;
    determining available bandwidth of digital signal processors of the plurality of DSPs;
    determining expandability of the at least one input task to networked devices;
    determining the availability of the at least one device;
    allocating the input task to support resources based upon the determined usage requirements, the determined available bandwidth, the expandability of the task across the network to networked devices, and the determined availability of the at least one device; and
    selectively configuring each DSP of the allocated support resources to perform the input task.

8. The method as set forth in claim 7, wherein each task comprises primitive operations, and said process descriptor block identifying usage requirements of primitive operations, said method further comprising breaking down each at least one input task into primitive operations, said determining usage requirements comprising combining usage requirements of the primitive operations that compose each input task.

9. A method for distributing an audio/video task comprising:
    receiving the audio/video (A/V) task;
    segmenting the A/V task into at least one primitive, each of the at least one primitive representing a basic processing component of the task;
    determining at least one support resource required to execute each of the at least one primitive by accessing requirement information relating to the capacity necessary to execute a set of predefined primitive functions, the requirement information including bandwidth needed for each of the at least one primitive, support resources needed for the at least one primitive, and expandability of the at least one primitive across at least one of the at least one DSP and networked support resources;
    maintaining capacity information indicative of current processing capacity of support resources available to execute at least one A/V task comprising corresponding primitives;

comparing the requirements information with the configuration information;

allocating the one or more primitives to one or more support resources based on the comparison; and configuring each allocated DSP of the allocated support resources to execute a corresponding, identified primitive.

10. The method of claim 9, wherein the A/V task is provided by a user, further comprising:

notifying the user if there is insufficient processing capacity to execute each primitive of the at least one primitive.

11. The method of claim 9, wherein said allocating the one or more primitives further comprises assigning start and finish times to each primitive of the at least one primitive, and basing the support resource allocation on the start and finish times of primitives relative to related primitives of the one or more primitives.

12. The method of claim 9, wherein the support resources are distributed throughout a plurality of A/V devices, the A/V devices being connected to a network.

13. The method of claim 12, wherein the one or more DSPs are distributed between at least two of the plurality of devices.

14. The method of claim 12, wherein the requirements information further includes an indicator of whether each of the primitives may be executed by a DSP located within an A/V device of the plurality of A/V devices other than an originating A/V device.

15. The method of claim 9, wherein the requirements information further includes a list of hardware and software resources that must be coupled to a DSP in order for the DSP to perform a primitive of the set of primitive functions.

16. The method of claim 9 wherein said configuring each DSP comprises transferring configuration data from a memory to each DSP, the configuration data based on a given primitive of the one or more primitives to be executed by each DSP.

17. The method of claim 9, further comprising after allocating the support resources, updating the DSP resource allocation information.

18. The method of claim 12, further comprising optimizing the A/V task by reordering the one or more primitives to be performed, and reallocating the reordered primitives, if there is insufficient processing capacity to execute each primitive of the one or more primitives as first ordered.

19. A scalable audio/video processor system comprising:

support resources to process A/V (audio/visual) tasks, said support resources including a plurality of configurable digital signal processors (DSPs);

a process descriptor block to identify usage requirements of at least one task primitive, said usage requirements for a given primitive including processing requirements of the given primitive that are to be supported by the support resources; and a control processor coupled to the support resources and to the process descriptor block, said control processor configured to:

segment an input A/V task into at least one primitive;

determine the usage requirements for each of the at least one segmented primitives by reference to the usage requirements in the process descriptor block;

providing a time stamp to each of the one or more segmented primitives, the timestamp indicating when execution of a given segmented primitive is to be started and when the output of the given segmented primitive is to be generated by;

determining the availability of the support resources;

if each of the at least one segmented primitives can be executed within their corresponding start and output times, then allocating each of the at least one segmented primitives to selected support resources based upon the determined usage requirements;

control the configuration of each DSP of the allocated support resources to perform one or more segmented primitives as allocated.

20. The system of claim 17, further comprising performing optimization procedures on the given A/V task if each of the one or more segmented primitives cannot be executed within their corresponding start and output times as originally ordered.

21. The system of claim 19, wherein said optimization procedures comprise:

reordering the at least one segmented primitives;

providing a time stamp to each of the at least one reordered primitives, the timestamp indicating when execution of a given reordered primitive is to be started and when the output of the given reordered primitive is to be generated by;

determining the availability of the support resources by looking up configuration information for each of the support resources;

if each of the one or more reordered primitives can be executed within their corresponding start and output times, then allocating each of the one or more segmented primitives to selected support resources based upon the determined usage requirements.

22. The system as set forth in claim 2, wherein the expandability field indicates whether a primitive can be executed on at least one of the DSPs across several boards and across networks.

* * * * *